Aug. 19, 1952     G. A. LYON     2,607,633
WHEEL STRUCTURE
Filed Jan. 25, 1947     2 SHEETS—SHEET 2
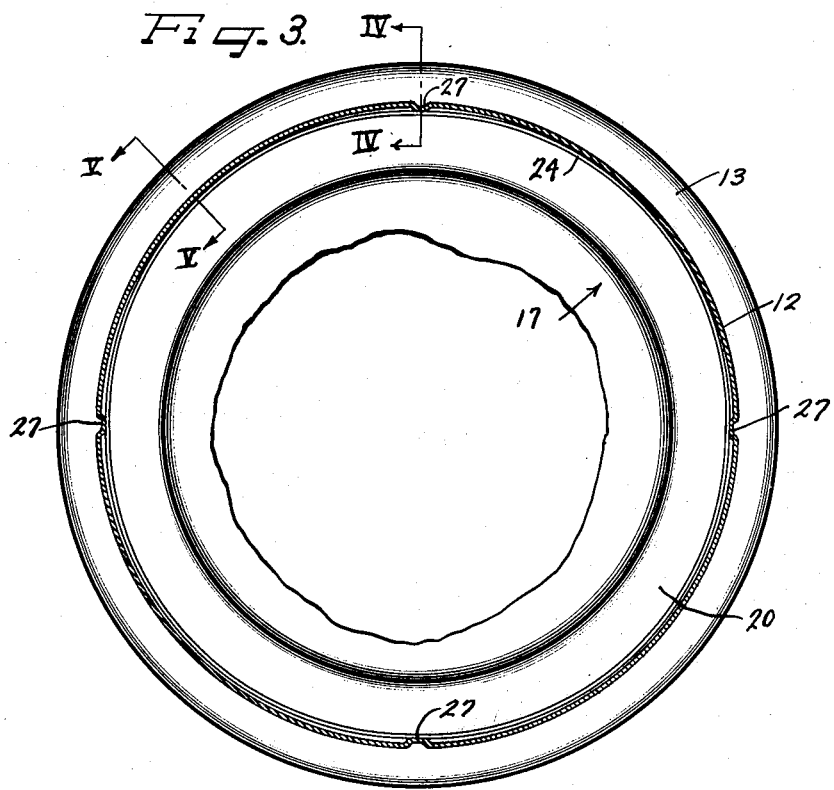
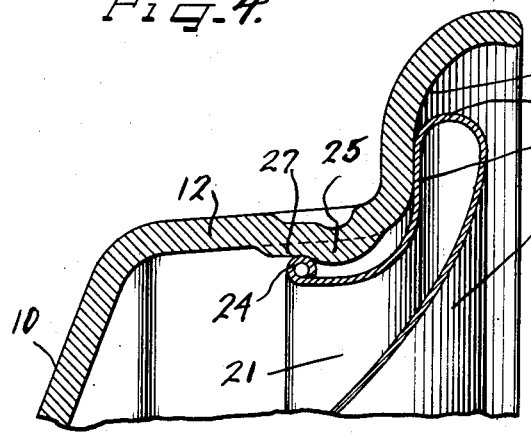 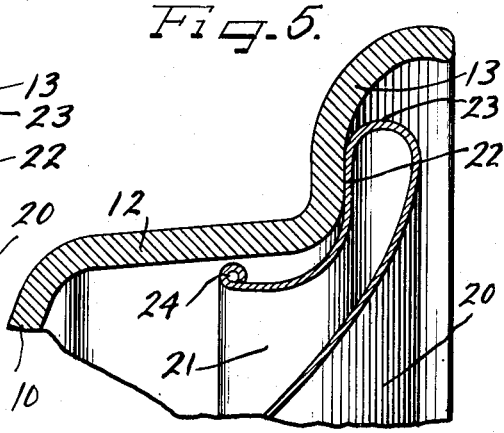
Inventor
GEORGE ALBERT LYON
by _____ Attys.

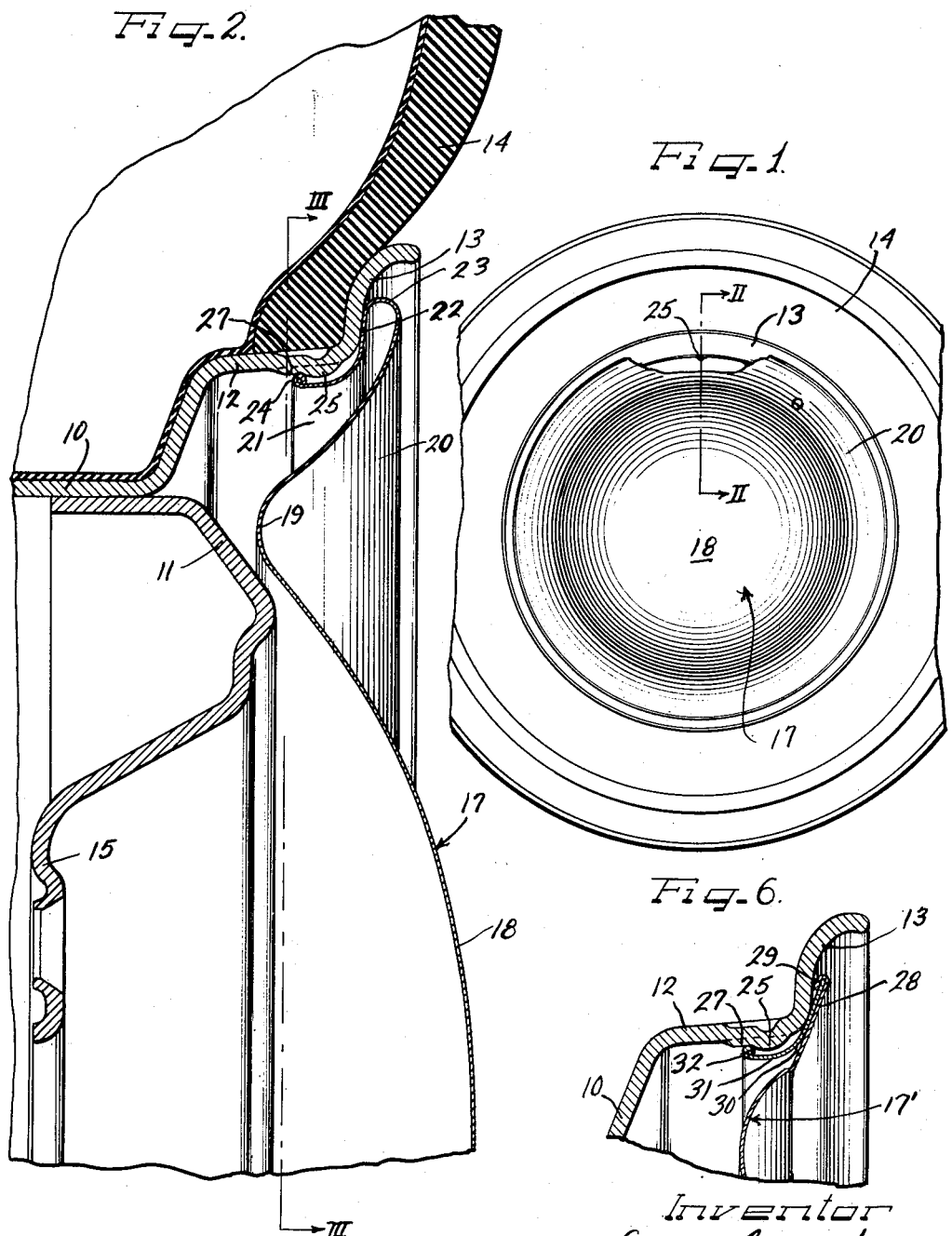

Patented Aug. 19, 1952

2,607,633

UNITED STATES PATENT OFFICE 2,607,633

WHEEL STRUCTURE

George Albert Lyon, Detroit, Mich.

Application January 25, 1947, Serial No. 724,259

7 Claims. (Cl. 301—37)

This invention relates to an improved wheel structure and more particularly to improvements in the construction of vehicle wheels and ornamental and protective covers therefor.

An important object of the present invention is to provide an improved wheel structure wherein an ornamental cover is secured in snap-on pry-off relation to the tire rim.

Another object of the invention is to provide an improved snap-on pry-off relationship between a wheel cover and the wheel.

A further object of the invention is to provide a wheel cover for substantially completely covering a vehicle wheel and having novel means for attaching the cover to the wheel at the tire rim of the wheel structure.

Still another object of the invention is to provide an improved wheel structure including novel means on the tire rim for retaining a wheel cover.

According to the general features of the invention there is provided a wheel structure including a multi-flanged tire rim and a load sustaining body part, and a cover for the outer side of the wheel including an axially inwardly extending marginal portion having an annular resilient attachment flange, the tire rim having retaining bumps thereon engageable by said resilient attachment flange in snap-on pry-off relationship, the relative diameters of the retaining flange and the adjacent bump-carrying portion of the tire rim and the construction of the retaining bump being such that the retaining flange is freely tensioned into thorough retained engagement with the retaining bumps.

According to other general features of the invention, the retaining bumps include radially protruding portions for holding the retaining flange of the cover against axial displacement from the retained engagement with the wheel and also spacer shoulders for maintaining the contiguous portions of the retaining flange in spaced relation to the tire rim and under deflected tension.

Other objects, features and advantages of the present invention will be readily apparent from the following detailed description of certain preferred embodiments of the invention taken in conjunction with the accompanying drawings, in which:

Figure 1 is a fragmentary side elevational view of a vehicle wheel assembly embodying the features of the present invention;

Figure 2 is an enlarged radial sectional view taken substantially on the line II—II of Figure 1;

Figure 3 is a vertical sectional view through the wheel structure taken substantially on the line III—III of Figure 2, but showing the entire circle of the wheel structure;

Figure 4 is an enlarged sectional detail view taken substantially on the line IV—IV of Figure 3;

Figure 5 is an enlarged radial sectional view taken substantially on the line V—V of Figure 3; and Figure 6 is a fragmentary radial sectional view substantially like Figure 2, but showing a slightly modified form of cover construction.

As shown on the drawings:

A vehicle wheel, such as an automobile wheel, incorporating the present invention includes a tire rim 10 and a load sustaining wheel body 11, both of which are adapted to be made from some suitable heavy gauge sheet metal rolled or pressed into shape.

The tire rim 10, as shown, is of the conventional multi-flanged, drop center type which includes at its outer side an intermediate generally axially outwardly extending flange 12 which merges with a generally radially outwardly extending and terminally axially outwardly curved outer flange 13. The flanged structure of the tire rim is adapted to support a pneumatic tire 14.

The wheel body 11 is secured in any preferred fashion to the base flange of the tire rim 10 and is preferably centrally dished to provide a bolt-on flange 15 upon which the wheel is adapted to be secured by means of cap screws or bolts to a part of a vehicle axle (not shown).

The wheel shown is of the relatively small diameter according to the modern trend for smaller wheels and larger tires.

For ornamentally and protectively covering the outer side of the wheel a cover 17 is provided. This cover is of an extent and magnitude to substantially entirely conceal the outer side of the wheel and to afford a smooth decorative appearance as well as to protect the wheel from road dirt and splash. Thereby, the relatively unattractive flanged and angularly contoured structure of the wheel is concealed and particularly the various grooves and crevices which, if exposed, would quickly acquire accumulations of dirt.

The wheel cover 17 is adapted to be made in one piece from suitable sheet material, such as sheet metal, which is adapted to be finished with a lustrous outer surface or may be painted or enameled to afford any preferred decorative scheme in harmony with the vehicle on which used. In cross sectional contour the cover is preferably formed with a central generally hub-cap simulating convex portion 18 which smoothly merges at an annular concave juncture 19 with a generally radially outwardly and axially outwardly convexly curved trim ring annular portion 20. The central portion 18 of the cover is of a diameter to substantially conceal the wheel body 11, and the trim ring portion 20 of the cover is of an expanse substantially covering the outer side of the tire rim 10.

The general cross sectional contour of the wheel cover is preferably such that the generally axially inwardly protruding annular rib provided by the juncture portion 19 extends into the relatively large annular axially outwardly opening groove which customarily exists between the tire rim, and particularly the intermediate flange 12 thereof, and the opposing generally axially outwardly bulging portion of the wheel body 11.

For retaining the cover 17 on the wheel, the outer margin of the cover, and more particularly of the trim ring portion 20 thereof, is formed with a generally axially inwardly extending engagement flange 21 integrally joined to the remainder of the cover by a generally radially extending return bent flange 22 of the cover margin. The flange 22 together with a marginal connecting radius 23 relatively rigidly reinforces the margin of the cover against distorting or damaging deflection.

The return bent connecting flange 22 may provide a seat which in the assembled relation of the cover with the wheel rests against the face portion of the terminal flange 13 of the tire rim. The connection between the seat flange 22 and the engagement flange 21 is preferably on such a radius as to clear the opposing portions of the tire rim and to render the engagement flange relatively radially resilient.

At its axially inner terminal, the engagement flange 21 is preferably reinforced by means of a radially and axially outwardly curled bead 24. The outer side diameter of the bead 24 is preferably, at least in the undeflected circular condition of the engagement flange 21, less than the diameter described by the opposing portion of inner face of the intermediate tire rim flange 12.

Projecting radially inwardly from the intermediate tire rim flange 12 is a plurality of symmetrically spaced cover-retaining bumps 25, herein shown as four in number, which at their peaks or points of greatest radially inward protrusion lie on a circle which is of smaller diameter than the diameter of the radially outermost circumference of the engagement flange bead 24. As a result, when the cover structure is to be applied to the wheel it is disposed substantially concentric therewith and presses inwardly to cause the retaining flange bead 24 to cam over the retaining bumps 25 by radially inward deflection of those portions of the bead and contiguous areas of the engagement flange 21 disposed at the bumps. The disposition of the bumps 25 is such that the bead 24 will have cammingly engaged fully behind the peaks of the bumps upon engagement of the connecting flange 22 of the cover with the tire rim outer flange 13, and thereby hold the cover firmly against the rim flange 13.

By having the radially outer diameter of the retaining flange bead 24 of smaller diameter than the opposing surface of the tire rim flange 12, the radially outwardly buckled portion of the bead intermediate the bumps 25 will at all times during the mounting of the cover remain out of contact with the tire rim flange and thereby avoid frictional resistance to application of the cover. Furthermore, this relationship avoids any radially inward resilient deflectional interference by the outwardly deflected intermediate portions of the bead 24 with the relatively strong radially outward tension generated in the radially inwardly deflected portions of the bead where they engage the retaining bumps 25. As a result, when the bead passes the retaining bumps peaks the radially inwardly bump-deflected portions of the bead expand with full deflection tension radially outwardly and cammingly snap the cover into the finally mounted position thereof with the connecting flange 22 seated on the outer tire rim flange 13.

Any tendency of the cover 17 to shift rotatively relative to the wheel is avoided by the provision of means for effecting what may be termed a frictional interlock between the cover retaining bumps and the retaining flange bead 24. To this end, the tire rim flange at the axially inner side of each of the bumps is provided with a generally radially inwardly and axially inwardly extending frictional interlock shoulder 27, but of less radially inner extent than the peak portions of the companion bumps. The frictional interlock shoulders 27 lie on a circle which is of slightly smaller diameter than the undeflected outer side diameter of the retaining flange bead 24. As a result, after the retaining flange bead 24 has cammed to the full cover retaining axially inner position thereof, the bump engaging portions thereof are maintained in a radially inwardly deflected state by the shoulders 27, as best seen in Figs. 3 and 4, which maintains such portions deflected and under substantial resilient tension. The frictional interlock thus afforded holds the cover against rotating relative to the wheel.

Of course, the frictional anti-rotating interengagement effected by the shoulders 27 is supplemented by the frictional interengagement of the intermediate connecting and seating flange 22 and the rim flange 12. However, the latter would not, under most conditions afford adequate frictional resistance to turning due to various inaccuracies in the opposing surfaces of the tire rim and the cover. On the other hand, the frictional engagement between the retaining flange bead 24 and the frictional interlock shoulders 27 functions at all times with maximum efficiency. Hence the interengagement therebetween is entirely unaffected by any manufacturing inaccuracies because the bead 24 exerts unimpaired tension against the shoulders 27 because the intermediate portions of the bead remain out of any functional engagement with the tire rim flange 12, and preferably remain in spaced relation thereto as best seen in Figs. 3 and 5.

According to convenient manufacturing practice, the bumps 25 and the interlock shoulders 27 may be integrally pressed from the tire rim flange 12.

For removing the cover 17, a pry-off tool such as a screw driver inserted between the cover edge provided by the radius 23 and the tire rim outer flange 13 and appropriately manipulated will cause the retaining flange bead 24 to be cammed axially outwardly past the retaining bumps 25 or at least one of them and thus free the cover for removal.

In the modified form of Figure 6, the cover 17' has an outer trim ring portion 28 thereof formed with a relatively narrow radially outer marginal underturned integral clamping flange 29 which engages and permanently secures thereto the radially outer margin of an annular wheel engaging portion 30. The latter extends generally inwardly and then axially inwardly to provide an axally extending engagement flange 31 having a generally radially and axially outwardly curled reinforcing and retaining bump engaging bead 32. The advantage of this form of cover construction is that while the main body of the cover may be formed of a stamping, the cover engaging portion 30 may be formed as a separate ring from a rolled section which affords certain manufacturing economies. However, the cover engaging portion 30 and the engagement flange 31 and the bead 32 function in all essential respects the same as the previously described engagement flange 21 and the bead 24, respectively, in cover-retaining engagement with the bumps 25 and the frictional interlock shoulders 27.

I claim as my invention:

1. In a wheel structure including a tire rim and a body part, the tire rim having a generally radially inwardly facing flange including a plurality of spaced radially inwardly projecting cover retaining bumps, a wheel cover of a diameter to substantially entirely cover the wheel and having a marginal portion engageable in snap-on pry-off relation with said bumps, said cover retaining bumps having at the axially inner sides thereof axially inwardly extending and radially inwardly facing frictional interlock shoulders protruding to a lesser radially inner extent than the bumps, and said wheel-engaging marginal portion of the cover engaging said shoulders under deflectional tension.

2. In combination in a wheel structure including a tire rim and a body part, the tire rim being of the multi-flanged type including a generally axially extending intermediate flange and a generally radially outer terminal flange, said intermediate flange having radially inwardly extending cover retaining bumps adjacent to the juncture thereof with said outer flange, and a cover for substantially concealing the outer side of the wheel including a marginal portion extending generally radially and axially inwardly from the outer margin thereof and providing a seat for engaging said outer tire rim flange and an engagement flange for snap-on pry-off engagement with said cover retaining bumps, said engagement flange having a generally radially and axially outwardly curled reinforcing bead of a smaller diameter than the inside diameter of said intermediate tire rim flange and in full assembly of the cover on the wheel and of the bead with the bump remaining out of engagement with said intermediate tire rim flange.

3. In combination in a wheel structure including a tire rim and a body part, the tire rim being of the multi-flanged type including a generally axially extending intermediate flange and a generally radially outer terminal flange, said intermediate flange having radially inwardly extending cover retaining bumps adjacent to the juncture thereof with said outer flange, and a cover for substantially concealing the outer side of the wheel including a marginal portion extending generally radially and axially inwardly from the outer margin thereof and providing a seat for engaging said outer tire rim flange and an engagement flange for snap-on pry-off engagement with said cover retaining bumps, said engagement flange having a generally radially and axially outwardly curled reinforcing bead of a smaller diameter than the inside diameter of said intermediate tire rim flange and in full assembly remaining out of counter-tensioning engagement with said intermediate tire rim flange, each of said bumps having at the axially inner side thereof a frictional interlock shoulder extending generally axially inwardly and engaging the bead for maintaining the same under radially inward deflection and thereby under frictional interlock tension with the shoulder.

4. In a wheel structure including a part having a series of spaced generally radially inwardly extending cover retaining bumps, said bumps including at the axially inner sides thereof respective generally axially inwardly extending frictional interlock shoulders of less radially inward extent than the bumps, and a circular wheel cover having a generally axially inwardly extending annular portion of smaller diameter than said wheel part and providing a resiliently deflectable annular bump-engaging formation cammingly deflectable over said bumps and being of slightly greater diameter than the diameter of a circle about said shoulders and engaging said shoulders under radially inward deflection with the intermediate extents of said formation freely exerting resilient tensioning force on the shoulder-engaging parts thereof.

5. In a wheel structure including a tire rim having an intermediate generally axially extending flange and a terminal flange projecting generally radially outwardly from juncture with the intermediate flange, said intermediate flange having adjacent to juncture with the terminal flange a radially inwardly pressed bump adapted for retaining a cover on the wheel, said bump including at the axially inner side thereof a generally axially inwardly extending frictional interlock shoulder also pressed radially inwardly in the intermediate flange but projecting to less radially inward extent than the bump.

6. In combination, a vehicle wheel including a tire rim having generally radially inward extending rigid protuberance means, each protuberance means including a shoulder at the axially inner side thereof of less radially inward extent than the portion of the protuberance means axially outwardly from the shoulder means, a wheel cover comprising a crown portion and a trim ring portion having a stiffened inturned outer marginal portion merging into a rearwardly extending annular resilient engagement flange, the axially inner edge of said flange being formed to have a smooth sliding cooperation with said rigid protuberance means, with said resilient engagement flange having portions in holding contact with said shoulders and thereby causing flexing of the resilient flange in radially inward direction at a plurality of points of contact with said shoulders and resilient bulging of said flange in radially outward direction at points between said contact points whereby the whole flange acts in entirety to exert a holding pressure to retain the cover on the wheel.

7. In a wheel structure including a load sustaining body portion and a multi-flanged tire rim supported at the periphery of the body portion and including a generally axially extending intermediate flange and a generally radially outwardly extending terminal flange, said intermediate flange having adjacent to juncture of the same with the terminal flange a series of radially inwardly projecting rounded retaining bumps, a wheel cover of a diameter to overlie the outer side of the wheel including at least a portion of the terminal flange and including a concealed marginal flange extending generally radially inwardly and then axially inwardly from overlying relation to the terminal flange into opposed relation to said bumps at the radially inner side of the bumps, said flange having the axially inner terminal edge thereof curled radially outwardly into a tight reinforcing and bump-engaging bead and being resiliently flexible for snap-on pry-off engagement with said bumps, and means at the axially inner sides of said bumps engageable by said bead in the retained relation of the cover on the wheel to maintain said bead under resilient stress to resist turning of the cover due to torque stresses in service.

GEORGE ALBERT LYON.

REFERENCES CITED

The following references are of record in the file of this patent:

UNITED STATES PATENTS

| Number | Name | Date |
|---|---|---|
| Re. 22,042 | Lyon | Mar. 3, 1942 |
| 2,113,541 | Blank | Apr. 5, 1938 |
| 2,239,898 | Lyon | Apr. 29, 1941 |
| 2,276,405 | Lyon | Mar. 17, 1942 |
| 2,281,153 | Horn | Apr. 28, 1942 |
| 2,368,229 | Lyon | Jan. 30, 1945 |
| 2,368,249 | Lyon | Jan. 30, 1945 |

FOREIGN PATENTS

| Number | Country | Date |
|---|---|---|
| 503,270 | Great Britain | Apr. 4, 1939 |